June 8, 1954 — E. W. BENOIT ET AL — 2,680,637
RESILIENT COUPLING FOR HOUSEHOLD MIXERS
Filed May 1, 1951

Inventors:
Eugene W. Benoit,
Otto F. Gerry,
by
Their Attorney.

Patented June 8, 1954

2,680,637

UNITED STATES PATENT OFFICE 2,680,637

RESILIENT COUPLING FOR HOUSEHOLD MIXERS

Eugene W. Benoit, Bergen, and Otto F. Gerry, Brockport, N. Y., assignors to General Electric Company, a corporation of New York Application May 1, 1951, Serial No. 223,962

2 Claims. (Cl. 287—119)

This invention relates to household mixing devices and more particularly to resilient couplings for retaining the beater elements of such mixing devices in operative driving relationship with their power units.

In U. S. Letters Patent 2,269,170, Allenby, granted January 6, 1942, and assigned to the same assignee as the present invention, there is described a type of resilient coupling particularly adapted for use in household mixing devices. This invention is also concerned with that type coupling, and it has as its general object the provision of new and improved resilient retaining means for use therein. In addition, this invention has as a more specific object the provision of an improved coupling in which are included the new and improved retaining means.

In accordance with the invention, a resilient member comprising a multiturn coiled spring is employed to retain a beater shaft in operative driving relationship with its driving spindle, whereby the shaft may be more easily attached to and disengaged from the spindle than heretofore has been possible. The coiled spring is disposed around a portion of the spindle with its several turns in coaxial relation with the spindle, and is adapted to engage lugs mounted upon the beater shaft. These lugs are received by slots provided in the spindle for that purpose and are used to accomplish a dual function. Through their contact with the coiled spring, they hold the shaft and the spindle together, while through their contact with the slots they provide the necessary driving connection between the shaft and the spindle. The coil spring is expansible by the lugs to allow their passage thereby upon an axial force being supplied the beater shaft. This permits a ready coupling of the shaft to the spindle as well as an easy removal of the shaft therefrom.

The features of this invention which are believed to be novel are set forth with particularity in the appended claims. The invention itself, however, both as to organization and mode of operation, together with further advantages thereof, may be best understood by reference to the following description, to be taken in conjunction with the accompanying drawing in which:

Figure 1:
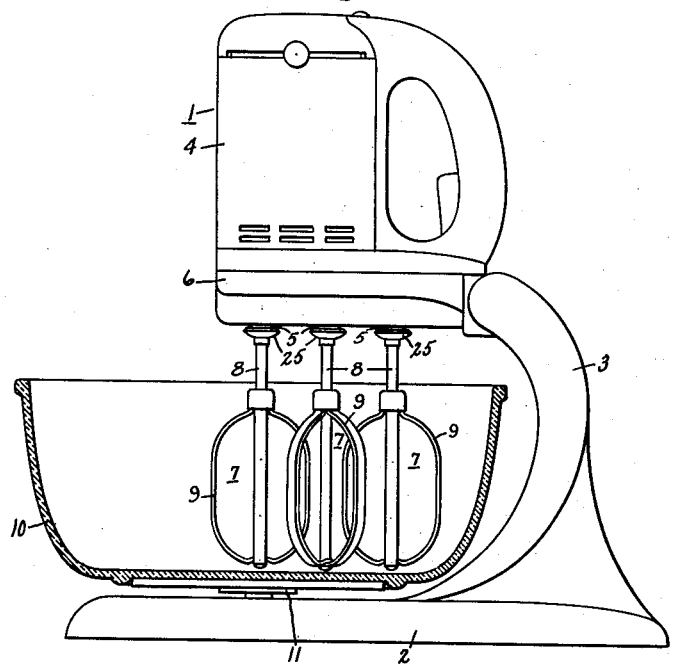
Fig. 1 is a side elevation view of a household mixing device which is provided iwth improved spindle and shaft coupling embodying this invention.

Referring to Fig. 1 of the drawing, therein is shown a household mixing device comprising a power unit 1 mounted on a base 2 by a suitable arm 3. Included in the power unit is an electric motor 4 which drives a plurality of driving spindles 5 through suitable gear means (not shown). Spindles 5 are journaled for rotation in a gear frame 6 and are disposed on spaced parallel vertical axes.

Driven by these spindles are mixing tools 7, each of which includes a drive shaft 8 and a beater element 9. The beater elements are secured on the lower ends of the drive shafts and are arranged to operate in a mixing bowl 10, the bowl itself being positioned on a turntable 11 which is rotatably mounted on base 2.

Figure 2:
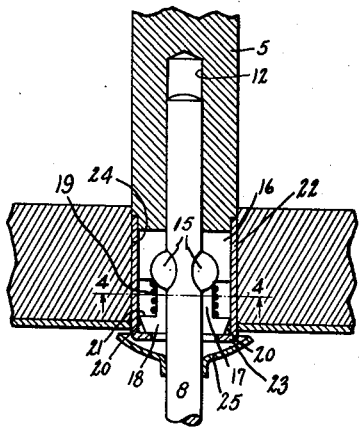
Fig. 2 is an enlarged fragmentary sectional view taken through a portion of the device shown in Fig. 1 and illustrating an improved coupling embodying this invention.
Figure 3:
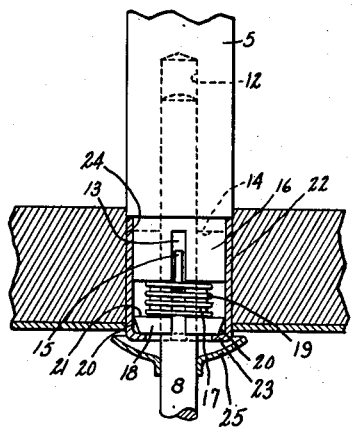
Fig. 3 is an enlarged fragmentary view in partial section showing the coupling of Fig. 2 displaced 90 degrees.
Figure 4:
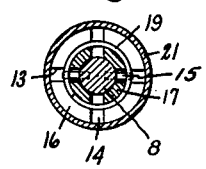
Fig. 4 is a sectional view of the coupling alone, taken on the line 4—4 of Fig. 2.

As is shown in Figs. 2, 3 and 4, the beater shafts are attached to spindles 5 by new and improved means embodying this invention. Thus, each spindle 5 contains an axially extending recess 12 which is adapted to receive the upper end of a drive shaft 8. Adjacent its lower end, the wall of recess 12 is provided with right angle slots 13 and 14 while adjacent its upper end, shaft 8 is provided with a pair of oppositely positioned ears or lugs 15. Upon shaft 8 being inserted into recess 12, lugs 15 are received into either slot 13 or slot 14, depending upon the relative position of the shaft with respect to the spindle.

Provided at the slotted portion of the shaft are two portions of reduced diameter 16 and 17 and a flanged portion 18. The outside diameter of portion 17 is less than that of portion 16 and is also less than the distance between the outside edges of lugs 15. Thus, when the lugs 15 ride upwardly in either slot 13 or slot 14, they protrude slightly beyond the periphery of portion 17. The outside diameter of portion 16 is, however, greater than the distance between the outside edges of the lugs. The flanged portion 18 is frusto-conical in shape and its smallest diameter lies at the end of the spindle. At any point, the outer diameter of portion 18 is greater than the diameter of portion 17 and, at its greatest length, is substantially the same as the diameter of portion 16.

In accordance with this invention, a helically coiled multiturn spring 19 is positioned around portion 17 of the spindle, the various turns of the spring being in coaxial relation with the spindle whereby each of the turns surrounds portion 17. The spring is placed in position by forcing it upwardly against the end of spindle 5. The outwardly sloping sides 20 of flanged portion 18 causes spring 19 to expand so that it may move past the flanged portion into position around portion 17. Once the spring has been forced past portion 18, it contracts and is prevented from moving downwardly by the horizontal upper surface 21 of the flange.

After spring 19 has been placed in position, a ferrule 22 having an inwardly extending flange 23 is pressed onto reduced portion 16 of the spindle. This ferrule effectively closes the space lying between the upper edge of flange portion 18 and the wall of the recess 24 in frame 6 through which the spindle extends, and thereby makes it impossible for spring 19 to slip off reduced portion 17. Ferrule 22 also acts as a barrier to prevent the lubricating oil in the spindle bearing from seeping into slots 13 and 14, and thence onto the beater shafts and into the foodstuffs being mixed. This oil sealing function may be aided by placing felt washers (not shown) around the upper portion of the ferrule.

Conversely, to prevent food mixtures from working up the beater shafts into the frame and spindle, each beater shaft 8 is provided with a flanged projection or batter guard 25. This batter guard is located adjacent the bottom wall of frame 6 when the shaft is in operative driving relation with the spindle and interrupts the flow of any food mixture tending to creep up the shaft into the mixer power unit.

In order to place beater shaft 8 in operative driving relation with shaft 5, it must be inserted in recess 12 so that lugs 15 are received by either slot 13 or slot 14. Then shaft 8 is forced upwardly causing lugs 15 to contact spring 19 and force its expansion to allow their passage thereby. However, once lugs 15 have moved past spring 19, it again contracts and engages the underside of the lugs forming a barrier to prevent downward movement of the lugs. The spring thus retains the shaft in operative driving relation with the spindle.

To disengage shaft 8 from spindle 5 for cleaning or other purposes, a downward force is applied to the shaft. This causes lugs 15 to re-expand spring 19, permitting their movement downwardly past the spring and out of the spindle. As soon as the lugs have moved past spring 19, it will again return to the contracted position.

The use of a multiturn coiled spring as the shaft retaining means provides a considerable advantage over the resilient split rings heretofore employed for that purpose. The forces required to expand similar multiturn springs are substantially the same, whereas the forces required to expand two substantially identical split rings may differ considerably. This means that through the use of multiturn coil springs, the forces necessary to insert and remove the beater shafts are about the same from spindle to spindle, in contrast to the widely varying forces needed from spindle to spindle when the conventional split rings are employed. Therefore, when coil springs are used, less margin of error is required to allow for weak springs, and it is thus possible to employ coil springs which require less force for expansion than do most split rings. This makes insertion and removal of the beater shafts a much easier task, and tends to obviate the need for mechanical ejectors such as are found on many household mixers.

Although the illustrated manner of retaining the coil spring around the narrowest diameter portion of the spindle is preferred, there are other ways in which it may be held thereon. Thus, while in accordance with the patent statutes there has been described what at present is considered to be the preferred embodiment of this invention, it will be obvious to those skilled in the art that numerous changes and modifications may be made therein without departing from the invention, and it is, therefore, aimed in the appended claims to cover all such changes and modifications as fall within the true spirit and scope of the invention.

What we claim as new and desire to secure by Letters Patent of the United States is:

1. In a household mixing device or the like of the type having a driving spindle having a portion of reduced diameter adjacent one end thereof and having slots and an axially extending recess in said one end, said slots being radially disposed and open at their inner ends in a radial direction into said recess, a shaft removably received in said recess, said shaft being provided with lugs received in said slots to form a driving connection between said spindle and said shaft, and the distance between the outer edges of said lugs being greater than the diameter of said reduced diameter portion, that improvement comprising a multiturn coil spring disposed around said reduced diameter portion and engaging said lugs to support said shaft in said recess, the turns of said spring being coaxial with said spindle whereby each of said turns surrounds said reduced diameter portion, said spring being expansible by said lugs to a non-retaining position to allow passage of said lugs thereby during insertion and removal of said shaft from said spindle recess.

2. In a household mixing device or the like of the type having a driving spindle having radially extending slots and an axially extending recess in one end thereof, said slots being open at their inner ends in a radial direction into said recess, a shaft located in and removable from said recess, said shaft being provided with projecting lugs cooperating with the walls of said slots to form a driving connection between said shaft and said spindle, and said spindle having a portion of reduced diameter adjacent said one end with a diameter less than the distance between the outside edges of said lugs whereby a portion of said lugs extends beyond the outer periphery of said reduced diameter portion, that improvement comprising a multiturn coil spring disposed around said reduced diameter portion and engaging the under side of said lugs to retain said shaft in operative driving relation with said spindle, the turns of said spring being coaxial with said spindle whereby each of said turns surrounds said reduced diameter portion, said spring being expansible to a non-retaining position by said lugs upon movement of said shaft into and out of said spindle, and a flanged projection mounted on said spindle between said reduced diameter portion and said one end supporting said spring on said reduced diameter portion.

References Cited in the file of this patent

UNITED STATES PATENTS

| Number | Name | Date |
| --- | --- | --- |
| 702,934 | Errington | June 24, 1902 |
| 2,192,844 | Bean | Mar. 5, 1940 |
| 2,269,170 | Allenby | Jan. 6, 1942 |
| 2,325,434 | Stiles | July 27, 1943 |
| 2,467,606 | Young | Apr. 19, 1949 |

FOREIGN PATENTS

| Number | Country | Date |
| --- | --- | --- |
| 610,104 | Great Britain | Oct. 12, 1948 |
| 921,499 | France | Jan. 13, 1947 |